G. W. & W. F. WIMPEE.
Plow.
No. 202,688. Patented April 23, 1878.
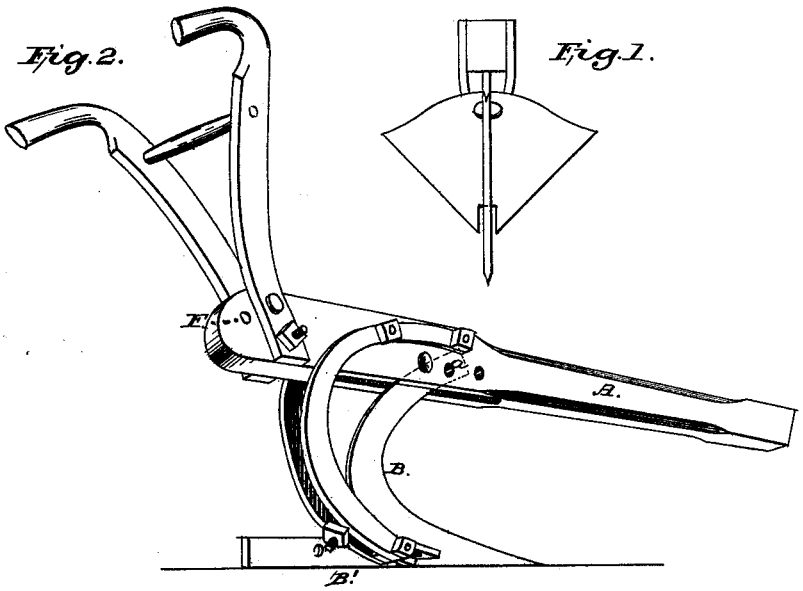
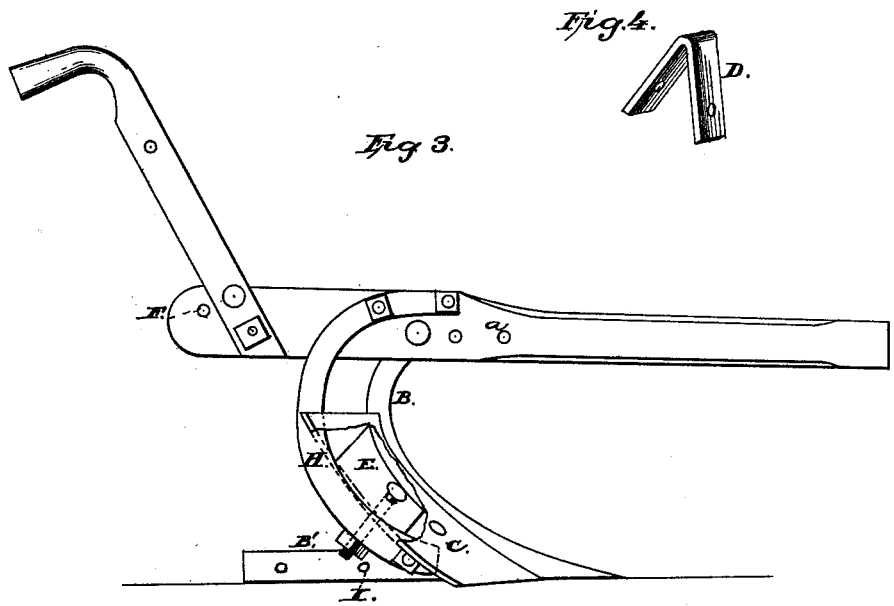
Attest:
John Pratt
John A. Wilson
Inventors:
George W. Wimpee
William F. Wimpee
N. PETERS, PHOTO-LITHOGRAPHER, WASHINGTON, D C.

UNITED STATES PATENT OFFICE.

GEORGE W. WIMPEE AND WILLIAM F. WIMPEE, OF CENTRE, ALABAMA.

IMPROVEMENT IN PLOWS.

Specification forming part of Letters Patent No. 202,688, dated April 23, 1878; application filed June 9, 1877.

*To all whom it may concern:*

Be it known that we, GEORGE W. WIMPEE and WILLIAM F. WIMPEE, of Centre, Cherokee county, Alabama, have invented an Improved Colter and Plow, of which the following is a specification:

Our invention relates to a combination plow and devices for adapting it to carry various cultivating implements, as will hereinafter be more fully described, and pointed out in the claim.

Figure 1 is a partial view, showing a sweep in combination with a cutter. Fig. 2 is a perspective view of plow with cutter alone placed for work. Fig. 3 is a side elevation, showing turn-plow combined with cutter, the plow being partly broken away. Fig. 4 is a partial view of knuckle for determining position and for support of turn-plow.

A, Fig. 2, is a beam, having a slot for the insertion of the cutter when used alone. The holes $a$ $a$ are for the passage of bolts, and used for adjusting the plow to varying pitch, and may be as numerous as desired.

B is the cutter, welded to and forming part of land-side B', and when used alone or with sweep is fixed in said slot, but when used in combination with turn-plow is bolted to left side of beam. The sweep is slotted at its point, so as to straddle the cutter when in place. The cutter is held in position by the iron slotted foot H, formed of two semicircular plates of iron, bolted on each side of the beam, and bolted at the end on each side of cutter when used with the cutter alone, or with cutter and sweep in combination, but bolted together, with only a nut between and to the right face of the cutter, when used with the turn-plow.

C is a turn-plow, which is bolted in position against the knuckle D, which is secured to the land-side and against a wood block, E, curved and tongued to coincide with inner curve of the plow-foot. The cutter, when used with other plows, is employed to cut turf and roots, and also to cut a way for the plows, thereby lessening draft and steadying the movement.

F is a supplemental hole for changing position of the handles. This is done by removing the bolt from the position shown and placing it in the hole below, changing the handles to correspond.

The side B' of cutter becomes a land-side or bar of the turn-plow when used in that combination. This land-side is furnished with a supplemental hole, which, in combination with hole I, may be used for changing the position of the cutter backward or forward on the beam.

We claim—

In a plow, the combination of the slotted and perforated beam A, cutting-standard and land-side B B', formed in one piece, and curved, slotted, or double brace H, the standard and brace arranged to be placed at different positions on beam A, to adapt it to carry a turn-plow or a sweep, or to be used without either as a root or sod cutter, substantially as shown and described.

G. W. WIMPEE.
W. F. WIMPEE.

Witnesses:
  JOHN PRATT,
  JAS. H. LEATH.